United States Patent [19]
Ueno

[11] Patent Number: 5,367,694
[45] Date of Patent: Nov. 22, 1994

[54] RISC PROCESSOR HAVING A CROSS-BAR SWITCH

[75] Inventor: Kiyoji Ueno, Yokohama, Japan

[73] Assignee: Kabushiki Kaisha Toshiba, Kawasaki, Japan

[21] Appl. No.: 750,940

[22] Filed: Aug. 28, 1991

[30] Foreign Application Priority Data

Aug. 31, 1990 [JP] Japan ................. 2-230106

[51] Int. Cl.$^5$ ................................ G06F 9/30
[52] U.S. Cl. ..................... 395/800; 395/375;
364/DIG. 1; 364/229; 364/229.2; 364/232.23
[58] Field of Search ............. 395/800, 162, 375;
364/731, 736; 95/375, 800

[56] References Cited

U.S. PATENT DOCUMENTS

| | | | |
|---|---|---|---|
| 4,766,566 | 8/1988 | Chuong | 395/375 |
| 4,942,525 | 7/1990 | Shintoui et al. | 395/375 |
| 5,197,137 | 3/1993 | Kumar et al. | 395/375 |

FOREIGN PATENT DOCUMENTS 0354585 8/1989 European Pat. Off. .
0368332 11/1989 European Pat. Off. .

OTHER PUBLICATIONS

Glenn Hinton, "80960-Next Generation", IEEE Computer Society Press Washington D.C., 4189, pp. 13-17.

Primary Examiner—Alyssa H. Bowler
Assistant Examiner—Mehmet Geckil
Attorney, Agent, or Firm—Finnegan, Henderson, Farabow, Garrett & Dunner

[57] ABSTRACT

An instruction cache unit output four instructions, each constituted by 32 bits, which are input to an instruction supplier. The instruction supplier distributes the four instructions to five. The five instructions are selectively supplied to two integer/logical arithmetic processor unit, two floating-point arithmetic processor unit, and a branch processor unit.

4 Claims, 3 Drawing Sheets

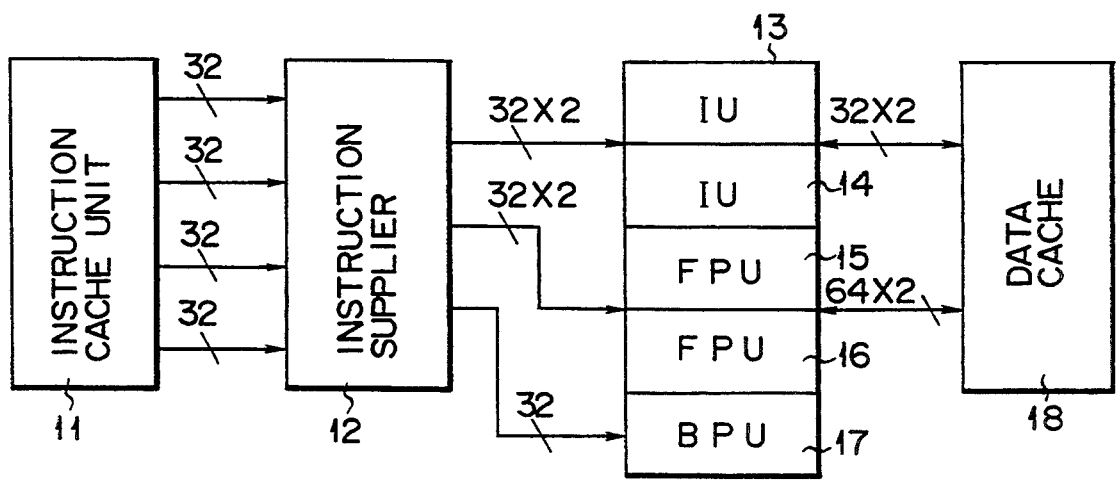
F I G. 1
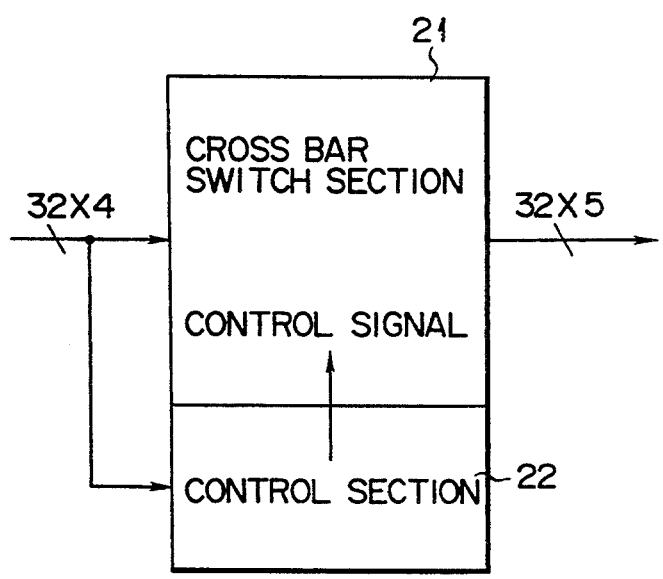
F I G. 2

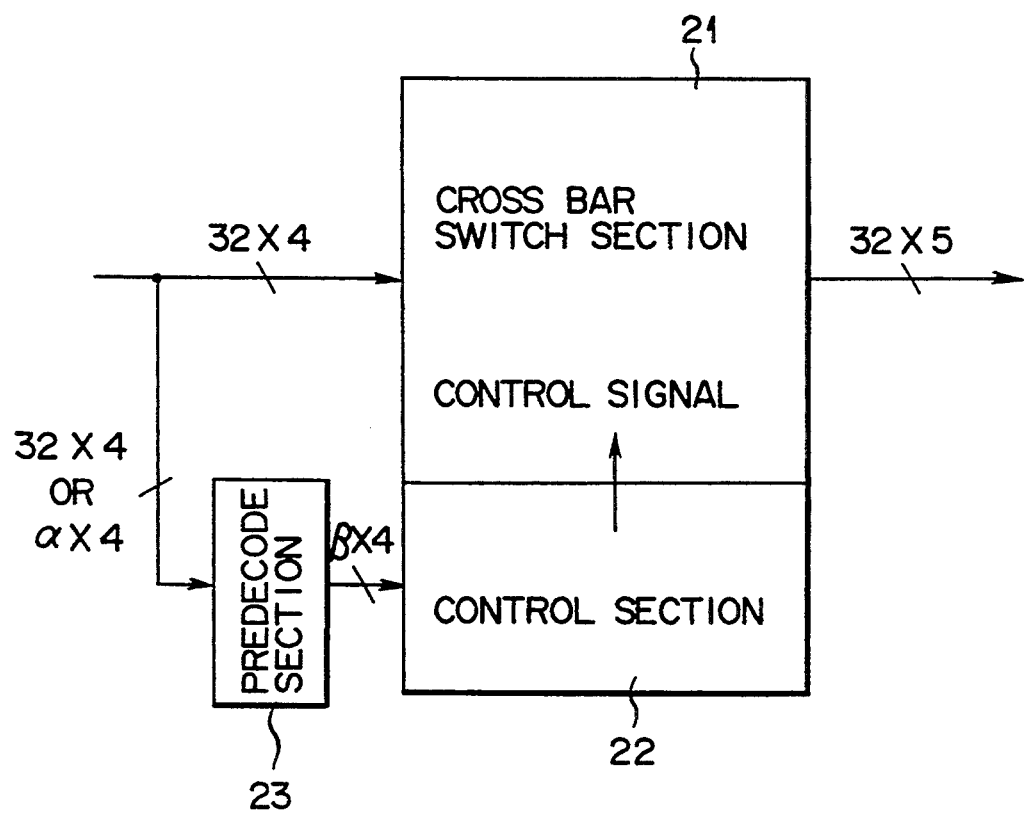
F I G. 4

RISC PROCESSOR HAVING A CROSS-BAR SWITCH

BACKGROUND OF THE INVENTION

1. Field of the Invention

This invention relates to a one-chip processor, and more particularly to a RISC (reduced instruction set computer) processor which efficiently supplies instructions.

2. Description of the Related Art

In general, a conventional microprocessor sequentially executes instructions. The conventional microprocessor is disadvantageous for the following reason: since the number of cycle (CPI: cycle per instruction) required for executing an instruction cannot be less than 1.0, it is impossible to improve the MIPS (million instruction per second) value, which indicates the performance of the microprocessor. Hence, in recent years, a Superscalar system or a VLIW (very long instruction word) system have been developed to decrease the CPI value, thereby improving the MIPS value. These methods are applied to, for example, a RISC processor, which has been developed and put to practical use. The RISC processor includes a plurality of pipe lines and executes instructions in parallel, thereby efficiently supplying instructions.

In the microprocessor of the Superscalar system, an instruction cache unit outputs instructions in parallel. The instructions are supplied to a plurality of instruction executing sections, such as an integer processor unit (IU) and a floating-point processor unit (FPU), and executed in parallel. However, in a conventional microprocessor of the Superscalar system, instructions are output in parallel from an instruction cache unit to instruction executing sections, and the instruction cache unit must output instructions of the same number as the instruction execution sections. Therefore, instructions cannot be efficiently supplied to executing sections.

SUMMARY OF THE INVENTION

It is accordingly an object of the invention to provide a RISC processor for efficiently supplying instructions.

According to the present invention, there is provided a RISC processor comprising:
instruction output means for outputting an N-number (positive integer) of instructions in parallel;
at least (N+1)-number of instruction executing means for receiving and executing the instructions; and
instruction distributing means for selectively distributing the N-number of instructions output from said instruction output means to said instruction executing means, wherein
said instruction distributing means comprises:
a cross bar switch section for distributing the N-number of instructions to the at least (N+1) instruction executing means; and
a control section for controlling said cross bar switch section,
each of the N-number of instructions is constituted by
an M-number (positive integer) of bits, and said cross bar switch section includes an (N×M) number of switch circuits, and
each of said switch circuits comprises:
an N-number of input lines;
an M number of output lines; and
an (N×M)-number of switch elements connected between said N-number of input lines and said M-number of output lines.

Additional objects and advantages of the invention will be set forth in the description which follows, and in part will be obvious from the description, or may be learned by practice of the invention. The objects and advantages of the invention may be realized and obtained by means of the instrumentalities and combinations particularly pointed out in the appended claims.

BRIEF DESCRIPTION OF THE DRAWINGS

The accompanying drawings, which are incorporated in and constitute a part of the specification, illustrate presently preferred embodiments of the invention, and together with the general description given above and the detailed description of the preferred embodiments given below, serve to explain the principles of the invention.

FIG. 1 is a block diagram showing a Superscalar microprocessor according to a first embodiment of the present invention;

FIG. 2 is a block diagram showing a detailed structure of the instruction supplier of the microprocessor shown in FIG. 1;

FIG. 4 is a block diagram showing a detailed structure of the instruction supplier of the microprocessor according to a second embodiment of the present invention.

DETAILED DESCRIPTION OF THE PREFERRED EMBODIMENTS

Figure 3:
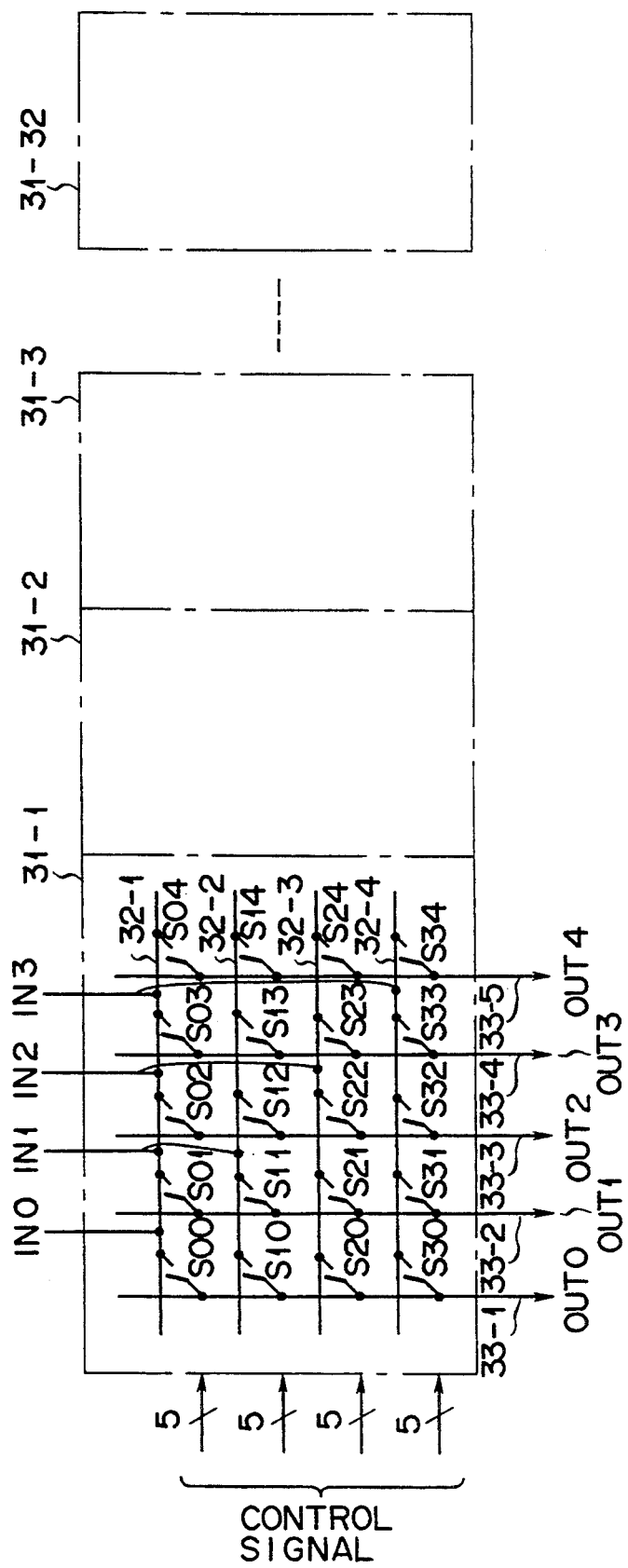
FIG. 3 is a block diagram showing a detailed structure of the cross bar switch section of the instruction supplier shown in FIG. 2.

A first embodiment of the present invention will now be described with reference to the accompanying drawings.

FIG. 1 is a block diagram showing the entire structure of a one-chip Superscalar microprocessor to which the RISC processor of the present invention is applied.

Referring to FIG. 1, an instruction cache unit 11 includes, for example, an instruction cache, and a buffer to which instructions read out from the instruction cache. The instruction cache unit 11 outputs a plurality of instructions fetched from the instruction cache, for example, four instructions as shown in FIG. 1. Each of the above-mentioned four instructions are constituted by 32 bits.

The four instructions output from the instruction cache unit 11 are input to an instruction supplier 12. The instruction supplier 12 distributes the instructions to any four of the five instruction executing sections. More specifically, the four instructions distributed by the instruction supplier 12 are selectively supplied to two integer processor units (IU) 13 and 14, two floating-point processor units (FPU) 15 and 16, and a branch processor unit (BPU) 17.

FIG. 2 is a block diagram showing a detailed structure of the instruction supplier 12. The instruction supplier 12 comprises a cross bar switch section 21 for distributing the four instructions to five unit and a control section 22 for generating a control signal to control the operation of the cross bar switch section 21.

The cross bar switch section 21 has four input ports corresponding to the four instructions, five output ports, and a plurality of switching elements connected between the input and output ports.

The control section 22 receives the four instructions and generates a control signal for controlling on/off operation of the switching elements on the basis of data of dependence between instructions and resource competitive data, which are obtained by decoding the four instructions.

FIG. 3 shows a detailed structure of the cross bar switch section 21 of the instruction supplier 12. The cross bar switch comprises thirty-two switch circuits 31-1 to 31-32 in accordance with the number of bits of the four instructions. The switch circuits 31-1 to 31-32 have the same structure, and the structure of the switch circuit 31-1, to which the data of the least significant bit of 32 bits is supplied, is shown as a representative. As shown in FIG. 3, the switch circuit 31-1 has four input lines 32-1 to 32-4, five output lines 33-1 to 33-5, and switches S00 to S04, S10 to S14, S20 to S24, and S30 to S34. Data of the least significant bit of input ports IN0, IN1, and IN2, and IN3 corresponding to the four instructions is respectively supplied to the four input lines 32-1 to 32-4. Data of the least significant bits of output ports OUT0, OUT1, OUT2, OUT3, and OUT4 is output through the five output lines 33-1 to 33-5. The switches S00 to S04, S10 to S14, S20 to S24, and S30 to S34 are formed of tristate buffers, transfer gates, or the like and are connected between the input lines 32-1 to 32-4 and the output lines 33-1 to 33-5. The on/off operation of the switches are controlled by a control signal generated from the control section 22.

In the above-described structure, the four instructions output in parallel from the instruction cache unit 11 are distributed by the instruction supplier 12 to the integer processor units 13 and 14, the floating-point processor unit 15 and 16, and the branch processor unit 17. In this time, the control section 22 generates a control signal in accordance with a predetermined algorithm, thereby stopping supplies of a competitive instruction or an invalid instruction, or supplying a instruction to do nothing. The integer processor units 13 and 14, the floating-point processor unit 15 and 16, and the branch processor unit 17, to which the instructions are supplied, performs calculations and processes in accordance with the instructions.

According to this embodiment, the instruction cache unit 11 need not outputs the same number of instructions as the instruction executing section but outputs a smaller number of instructions. Therefore, instructions can be supplied more efficiently than in a conventional device. The more the number of instruction executing sections and the higher the probability of executing instructions in parallel, the more efficiently the instructions are supplied.

Moreover, according to the above embodiment, input instructions and output instructions flows in the same direction in the cross bar switch section 21 of the instruction supplier 12. Hence, an useless area for wiring is reduced as compared to a processor wherein output instructions and input instructions flow perpendicular to each other, thereby decreasing the entire area of the one-chip processor.

FIG. 4 shows a detailed structure of instruction supplier 22 according to a second embodiment of the invention. In the second embodiment, a predecode section 23 is further provided. In the predecode section 23, 32 bits×4 instructions or $\alpha$ (an integer of 32 or less)×4 instructions supplied from the instruction cache unit 11 are decoded, thereby generating $\beta$ (an integer of 32 or less)×4 data required in the control section 22.

The present invention is not limited to the above embodiments but can be variously modified. For example, the instruction supplier distributes four instructions to five executing sections. However, any number of instructions may be input to or output from the instruction supplier.

As has been described above, the present invention provides a RISC processor wherein instructions can be efficiently supplied to instruction executing sections.

Additional advantages and modifications will readily occur to those skilled in the art. Therefore, the invention in its broader aspects is not limited to the specific details, and representative devices shown and described herein. Accordingly, various modifications may be made without departing from the spirit or scope of the general inventive concept as defined by the appended claims and their equivalents.

What is claimed is:

1. A RISC processor comprising:
   instruction output means for outputting an N-number, the N-number being a positive integer, of instructions in parallel;
   at least (N+1)-number of instruction executing means for receiving and executing the instructions; and
   instruction distributing means, including a crossbar switch section, for selectively distributing the N-number of instructions output from said instruction output means to selected ones of said at least (N+1) instruction executing means, wherein
   said instruction distributing means includes:
      a control section for controlling said cross bar switch section, wherein each of the N-number of instructions is constituted by an M-number, the M-number being a positive integer, of bits, and said cross bar switch section includes an M-number of switch circuits, and
   each of said switch circuits comprises:
      an N-number of input lines;
      an N+1 of output lines; and
      an (N×(N+1))-number of switch elements connected between said N-number of input lines and said (N+1)-number of output lines.

2. A RISC processor according to claim 1, wherein said (N×M) switch elements are tristate buffers.

3. A RISC processor according to claim 1, wherein said N input lines and said M output lines are arranged in parallel to one another.

4. A RISC processor according to claim 1, wherein on/off operations of said (N×M) switch elements are selectively controlled in accordance with data obtained by decoding the instructions output from said instruction output means.

* * * * *